US010941662B2

(12) United States Patent
Keating et al.

(10) Patent No.: US 10,941,662 B2
(45) Date of Patent: Mar. 9, 2021

(54) TURBINE WHEEL FOR A TURBO-MACHINE

(71) Applicant: Cummins Ltd, Huddersfield (GB)

(72) Inventors: Jon-Luke Keating, Huddersfield (GB); Jamie Archer, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 0 days.

(21) Appl. No.: 16/335,573

(22) PCT Filed: Sep. 20, 2017

(86) PCT No.: PCT/GB2017/052810
§ 371 (c)(1),
(2) Date: Mar. 21, 2019

(87) PCT Pub. No.: WO2018/055375
PCT Pub. Date: Mar. 29, 2018

(65) Prior Publication Data
US 2019/0345825 A1 Nov. 14, 2019

(30) Foreign Application Priority Data

Sep. 21, 2016 (GB) ..................................... 1616030

(51) Int. Cl.
*F01D 5/04* (2006.01)
*F02B 37/00* (2006.01)
(Continued)

(52) U.S. Cl.
CPC .............. *F01D 5/048* (2013.01); *F02B 37/00* (2013.01); *F01D 5/146* (2013.01); *F04D 29/242* (2013.01);
(Continued)

(58) Field of Classification Search
CPC ...... F01D 5/048; F04D 29/242; F04D 29/284; F04D 29/245; F04D 29/285;
(Continued)

(56) References Cited

U.S. PATENT DOCUMENTS 3,069,072 A * 12/1962 Birmann ................. F01D 5/146
  415/163
4,006,997 A *  2/1977 Friberg ................... F04D 21/00
  415/181
(Continued)

FOREIGN PATENT DOCUMENTS

CN       102080575 A     6/2011
EP         2022988 A1    2/2009
(Continued)

OTHER PUBLICATIONS

CN102080575—Translation and original (Year: 2010).*
(Continued)

*Primary Examiner* — Brian P Wolcott
*Assistant Examiner* — Behnoush Haghighian
(74) *Attorney, Agent, or Firm* — Faegre Drinker Biddle & Reath LLP (57) ABSTRACT

A mixed-flow turbine wheel is proposed which, compared to existing mixed-flow turbine wheels, has reduced mass and moment of inertia because radially-outer portions of existing mixed-flow turbine wheels are omitted. In a first possibility, the omitted material may be scalloping of the back face of the turbine wheel at a radial position outward of a base line which is a circle on the back surface of the wheel which indicates the minimum radius of the back surface. In a second possibility, part of the webbing of each blade is omitted to one side of the blade. Thus, viewing the turbine wheel in the axial direction, the area of the webbing outside the baseline and to one side of a radial line through the inducer tip, may be at least 20% less than that on the other side.

12 Claims, 9 Drawing Sheets

(51) Int. Cl.
    F04D 29/24     (2006.01)
    F04D 29/44     (2006.01)
    F04D 29/30     (2006.01)
    F04D 29/28     (2006.01)
    F01D 5/14      (2006.01)

(52) U.S. Cl.
    CPC .......... F04D 29/245 (2013.01); F04D 29/284
            (2013.01); F04D 29/30 (2013.01); F04D
            29/444 (2013.01); F05D 2240/304 (2013.01)

(58) Field of Classification Search
    CPC ...... F04D 29/286; F04D 29/30; F04D 29/444;
                    F05D 2240/304; F02B 37/00
    See application file for complete search history.

(56)            References Cited

U.S. PATENT DOCUMENTS 9,810,225  B2 *  11/2017  Yokoyama ............ F01D 9/026
    9,810,238  B2 *  11/2017  Annati ................ F04D 29/4226
    2008/0229742 A1 *  9/2008  Renaud ................... F04D 29/30
                                                            60/597
    2014/0369823 A1 * 12/2014  Yamashita ............ F04D 29/284
                                                            415/203
    2015/0086396 A1 *  3/2015  Nasir .................... F01D 17/165
                                                            417/407
    2016/0341072 A1 * 11/2016  Chandramohanan ..... F02C 7/24
    2018/0347571 A1 * 12/2018  Yamashita .............. F04D 17/12

FOREIGN PATENT DOCUMENTS

EP          2055893 A1    5/2009
    EP          3379028 A1    9/2018
    JP          2011252431 A  12/2011
    WO          2015119828 A1 8/2015

OTHER PUBLICATIONS

Leonard, T., et al., "A numerical study of automotive turbocharger mixed flow turbine inlet geometry for off design performance", IOP Conference Series: Materials Science and Engineering, vol. 52, Topic 4, (2013), Available on the Internet at https://iopscience.iop.org/article/10.1088/1757-899X/52/4/042012 on Mar. 21, 2019.

Rajoo, Srithar, et al., "Mixed Flow Turbine Research: A Review", Journal of Turbomachinery, vol. 130, No. 4, Oct. 2008; 12 pages.

International Search Report and Written Opinion issued by the European Patent Office dated Dec. 7, 2017, for International Application PCT/GB2017/052810; 12 pages.

Search Report issued by the United Kingdom Intellectual Property Office dated Mar. 9, 2017, for British Application No. 1616030.1; 4 pages.

* cited by examiner

TURBINE WHEEL FOR A TURBO-MACHINE

RELATED APPLICATIONS

This application is a U.S. National Stage Entry under 35 U.S.C. § 371 of International Patent Application No. PCT/GB2017/052810, filed Sep. 20, 2017, which claims priority to British Application No. 1616030.1, filed Sep. 21, 2016, the disclosures of which are hereby explicitly incorporated by reference herein.

FIELD OF THE DISCLOSURE

The present disclosure relates to a turbomachine, such as a turbocharger, having a turbine wheel.

BACKGROUND OF THE PRESENT DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of a rotor driven by a fluid to do useful work, for example, generating electrical power; and a compressor which uses the rotational energy of the rotor to compress a fluid.

Turbochargers are well known turbomachines for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings.

Figure 1:
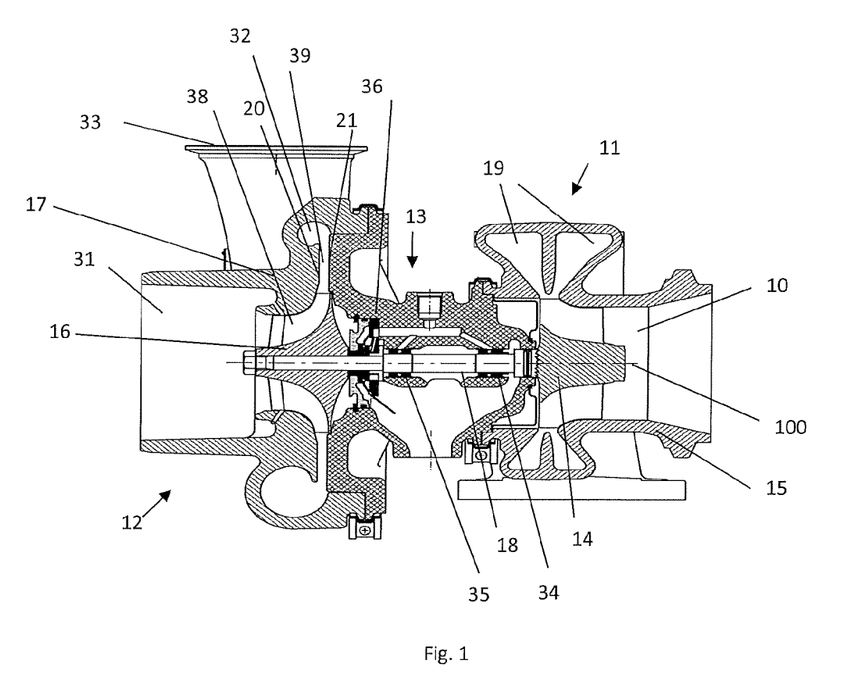
FIG. 1 is a cross-sectional drawing of a known turbocharger.

FIG. 1 shows a schematic cross-section through a known turbocharger. The turbocharger comprises a turbine 11 joined to a compressor 12 via a central bearing housing 13. The turbine 11 comprises a turbine wheel 14 for rotation within a turbine housing 15 about an axis 100. Similarly, the compressor 12 comprises a compressor wheel 16 (or "impeller") which can rotate within a compressor housing 17. The compressor housing 17 defines a compressor chamber 38 which is largely filled by the compressor wheel 16, and within which the compressor wheel 16 can rotate. The turbine wheel 14 and compressor wheel 16 are mounted on opposite ends of a common turbocharger shaft 18 which extends through the central bearing housing 13. The turbocharger shaft 18 is rotatably supported by a bearing assembly in the bearing housing 13 which comprises two journal bearings 34 and 35 housed towards the turbine end and compressor end respectively of the bearing housing 13. The bearing assembly further includes a thrust bearing 36.

The turbine housing 15 has at least one exhaust gas inlet volute 19 (in FIG. 1 two volutes are shown) located annularly around the turbine wheel 14, and an axial exhaust gas outlet 10. The compressor housing 17 has an axial air intake passage 31 and a volute 32 arranged annularly around the compressor chamber 38. The volute 32 is in gas flow communication with a compressor outlet 33. The compressor chamber 38 is connected to the volute 32 by a radially-extending diffuser space 39 (also referred to here as a "diffuser") which is a gap between a radially-extending shroud surface 20 of the housing 17, and a radially extending hub surface 21 of the bearing housing 13. The diffuser 39 is rotationally symmetric about the rotational axis of the shaft 18.

In use, the turbine wheel 14 is rotated by the passage of exhaust gas from the exhaust gas inlet volute 19 to the exhaust gas outlet 10. Exhaust gas is provided to the exhaust gas inlet volute 19 from an exhaust manifold (also referred to as an outlet manifold) of the engine (not shown) to which the turbocharger is attached. The turbine wheel 14 in turn rotates the compressor wheel 16 which thereby draws intake air through the compressor inlet 31 and delivers boost air to an inlet manifold of the engine via the diffuser 39, the volute 32 and then the outlet 33.

Various profiles are known for the turbine wheel 14. FIGS. 2(a) and 2(b) show a first known turbine wheel 14, respectively in a plan view looking along the axis 100 from the bearing housing, and in a side view perpendicular to the axis 100. In this document we will refer to the "front" of the turbine wheel 14 as the part which is furthest from the bearing housing 13 in the direction along the axis 100, and the "back" of the turbine wheel 16 as the part which is closest to the bearing housing 13 in the direction along the axis 100. The turbine wheel 14 has twelve blades 1 which are radially-equally spaced about the axis 100 (in other forms, the turbine wheel has a different number of blades). Each blade 1 has radially-outer edge 2 referred to as an inducer tip. The inducer tip 2 extends between a front end 6 and a back end 7. In this form of the turbine wheel 14, inducer tip 2 is axial (i.e. parallel to the axis 100).

The back face 3 of the turbine wheel extends radially outwardly from a hub 4 (the "weld boss") where the turbine wheel 14 is attached to the turbocharger shaft 18. The back face 3 has 12-fold rotational symmetry (i.e. its appearance is the same when it is rotated by 30 degrees about the axis 100). The radially outermost portions of the back face 3 are the back ends 7 of the inducer tips 2. To either circumferential side of each blade 1, the radially outer edge of the back face 3 becomes gradually closer to the axis 100, and its radially-innermost position is marked as point 5.

FIGS. 3(a) and 3(b) show a second known turbine wheel 14, respectively in a plan view looking along the axis 100 from the bearing housing, and in a side view perpendicular to the axis 100. This turbine wheel 14 also has twelve blades 1 which are radially-equally spaced about the axis 100 (though, again, the number of blades may be different). Again, each blade 1 has an inducer tip 2 which extends between a front end 6 and a back end 7, but in this second form of the turbine wheel 14, the inducer tip 2 is inclined to the axis 100. Specifically, although all points along the inducer tip 2 have the same distance from the axis 100, the direction from the front end 6 to the back end 7 includes a component in the circumferential direction (though not in the radial direction). This is known as "bucketing".

In FIG. 3(a) a baseline circle 40 is shown on the back face 3 of the turbine wheel 14 connecting the radially-inner points 5 of the radially-outer edge of the back face 3. At least radially-outwardly from the circle 40, the back face is flat (to within manufacturing tolerances). However, between the baseline circle 40 and the hub 4 the back face 3 may be slightly concave ("scalloping"). In other words, unnecessary material within the baseline circle 40 is absent, to reduce the weight of the turbine wheel.

Figure 2:
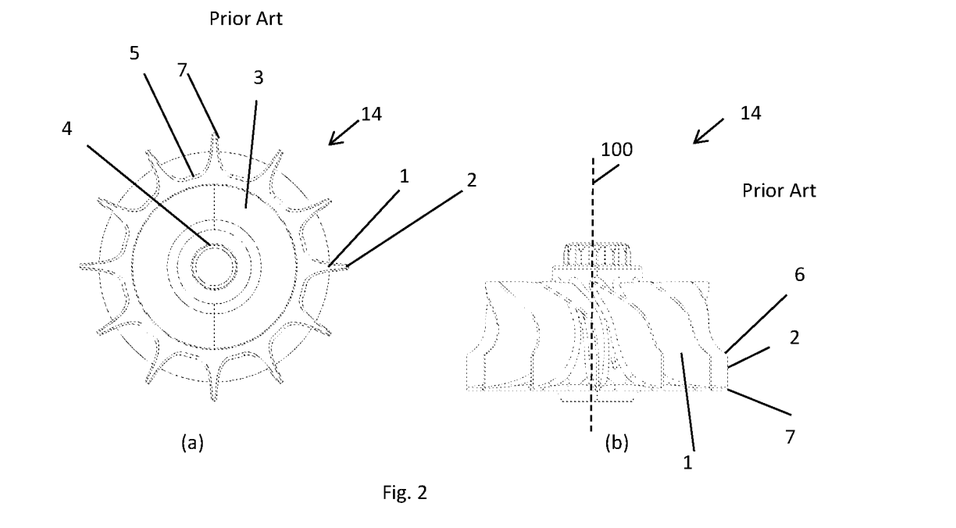
FIG. 2, which is composed of FIGS. 2(a) and 2(b), shows two views of a first known turbine wheel.
Figure 3:
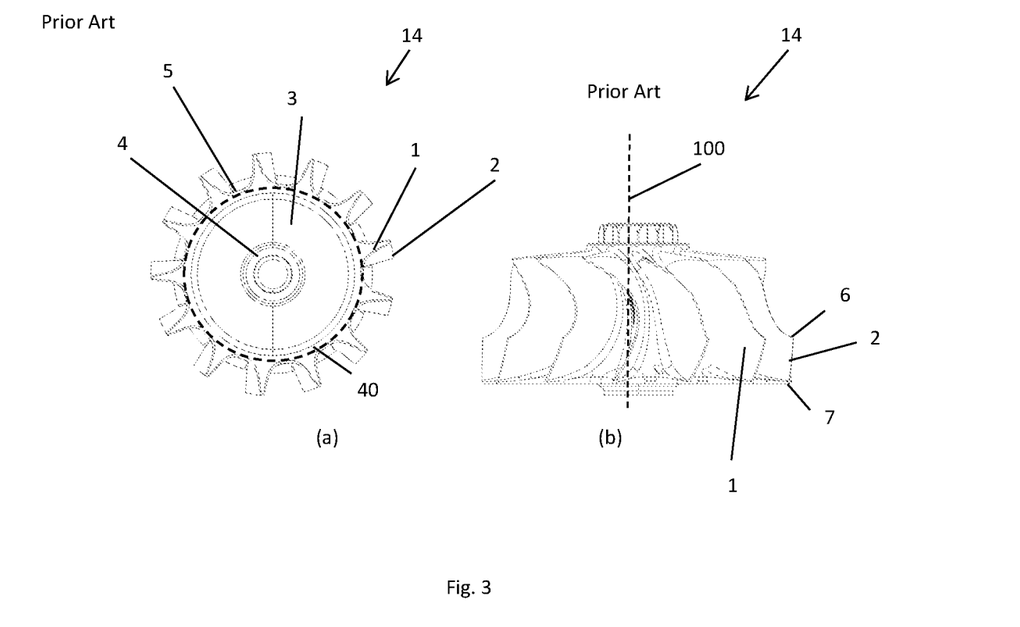
FIG. 3, which is composed of FIGS. 3(a) and 3(b), shows two views of a second known turbine wheel.

As noted above, the inducer tip 2 of the turbine wheels 14 shown in FIG. 2 or 3 is perpendicular to the radial direction.

Such turbine wheels are referred to as "radial" turbine wheels, for use in "radial" turbines. In addition, turbine wheels are known in which the inducer tip is inclined to the radial direction. These are known as "mixed-flow" turbine wheels, for use in "mixed flow" turbines. Mixed flow turbines use heavy bucketing in order to generate high efficiency at low speed ratios (i.e. when the value U/c is low, where U is the velocity of the inducer tip and c is the velocity of the exhaust gas contacting it). Additional turbines exist in which the inducer tip is perpendicular to the axial direction ("axial turbines") but such turbines are more commonly used in jet engines than in turbochargers.

SUMMARY OF THE DISCLOSURE

The disclosure aims to provide a new and useful turbine wheel for a turbomachine.

In general terms, the disclosure proposes omitting material from radially-outer portions of a mixed-flow turbine wheel to reduce the mass of the turbine wheel. Specifically, mass is omitted outside the base line (that is, the circle on the back surface of the wheel which indicates the minimum radius of the back surface). Reducing the mass means that the turbine has an improved transient response. Note that it is more beneficial to omit radially outward material than radially inward material, since the omission of radially outward material reduces the moment of inertia of the turbine wheel more than omission of the same mass of radially inward material.

A first aspect of the disclosure is that, in a mixed-flow turbine wheel, there is scalloping of the back face of the turbine wheel at a radial position outward of the base line. The scalloping extends to proximate the back end of the inducer tip. In numerical simulations, it has been observed that it is possible to do this without causing undue stresses in the blade.

A second aspect of the disclosure is that the webbing provided on a blade of a mixed-flow turbine wheel is asymmetric about a plane including the rotational axis and the circumferential centre of the blade, with less webbing provided on the pressure side of the blade (that is, the side which, in use, is the upstream side) than the other side of the blade (in use, the downstream side). Viewing the turbine wheel in the axial direction, the area of the webbing to one side of a radial line through the inducer tip, and outside the baseline, may be at least 20% less than on the other side, and more preferably at least 25% or even at least 30% or 40% less than on the other side. It has been observed in numerical simulations that reducing the amount of webbing on one side of the blade compared to existing turbine blades does not cause undue stresses in the blade.

BRIEF DESCRIPTION OF THE DRAWINGS

A non-limiting embodiment of the disclosure will now be described, for the sake of example only, with reference to the following figures, in which:

FIG. 5(a) is composed of FIGS. 5(a) to 5(c) which respectively show enlarged portions of the turbine wheels of FIGS. 2 to 4;

DETAILED DESCRIPTION OF THE EMBODIMENTS

FIGS. 4(a) and (b) show the profile of a turbine wheel 114 which is a first embodiment of the disclosure. The turbine wheel 114 is suitable for use in a turbocharger as shown in FIG. 1, replacing the turbine wheel 14. FIG. 4(a) shows the turbine wheel 114 as viewed perpendicular to the axis 100. Elements of the turbine wheel 114 which correspond to elements of the turbine wheel 14 are given reference numerals 100 higher. The turbine wheel 114 is a one-piece element formed typically by casting and machining.

The turbine wheel 114 also has eleven blades 101 which are radially-equally spaced about the axis 100 (again, the number of blades may be different, and is it generally denoted as n, which is typically about eleven or twelve; the turbine wheel 114 has n-fold symmetry about the axis 100). Each blade 101 has an inducer tip 102 which extends between a front end 106 and a back end 107. In the turbine wheel 114, the inducer tip 102 is not only inclined to the axis 100 but the front end 106 is further from the axis 100 than the back end 107. That is, turbine wheel 114 is a mixed flow turbine wheel. Like other mixed flow turbines, the turbine wheel 114, uses bucketing in order to generate high efficiency at low speed ratios. That is, the component of the length direction of the inducer tip 102 length which is perpendicular to the radial direction, is inclined to the axial direction.

FIG. 4(b) is a schematic cross-sectional view in a plane including the axis 100 and the back end 107. As indicated in FIG. 4(b), we define the mixed flow angle $\alpha$ as the angle between a radial line 109 passing through the back end 107 of the inducer tip, and the component of the length direction of the inducer tip 102 (i.e. the straight line through the circumferential centres of the front and back ends 106, 107 of the inducer tip 102) which is perpendicular to the circumferential direction. In the present disclosure, mixed flow turbine wheels are considered for which the value of the mixed flow angle $\alpha$ is in the range 10° to 45°. If the value of the mixed flow angle $\alpha$ is much greater than this, then the turbine wheel has reduced benefits over a radial turbine wheel; if the value of the mixed flow angle $\alpha$ is lower than this, the turbine is effectively an axial turbine, with its attendant disadvantages (such as increased cost to achieve the same relative performance).

The gas flow direction is illustrated by the arrow A. An indicative hub line 141 is included in FIG. 4(b) schematically, although in fact the hub line is circumferentially spaced from the cross-sectional plane of FIG. 4(b). The hub line is the radially inner surface of the turbine wheel 114 at each axial position along the turbine wheel 114. Note that the hub line 141 of the embodiment is unchanged from that of a known mixed flow turbine wheel. Techniques are known for optimising the hub line 141.

Figure 4:
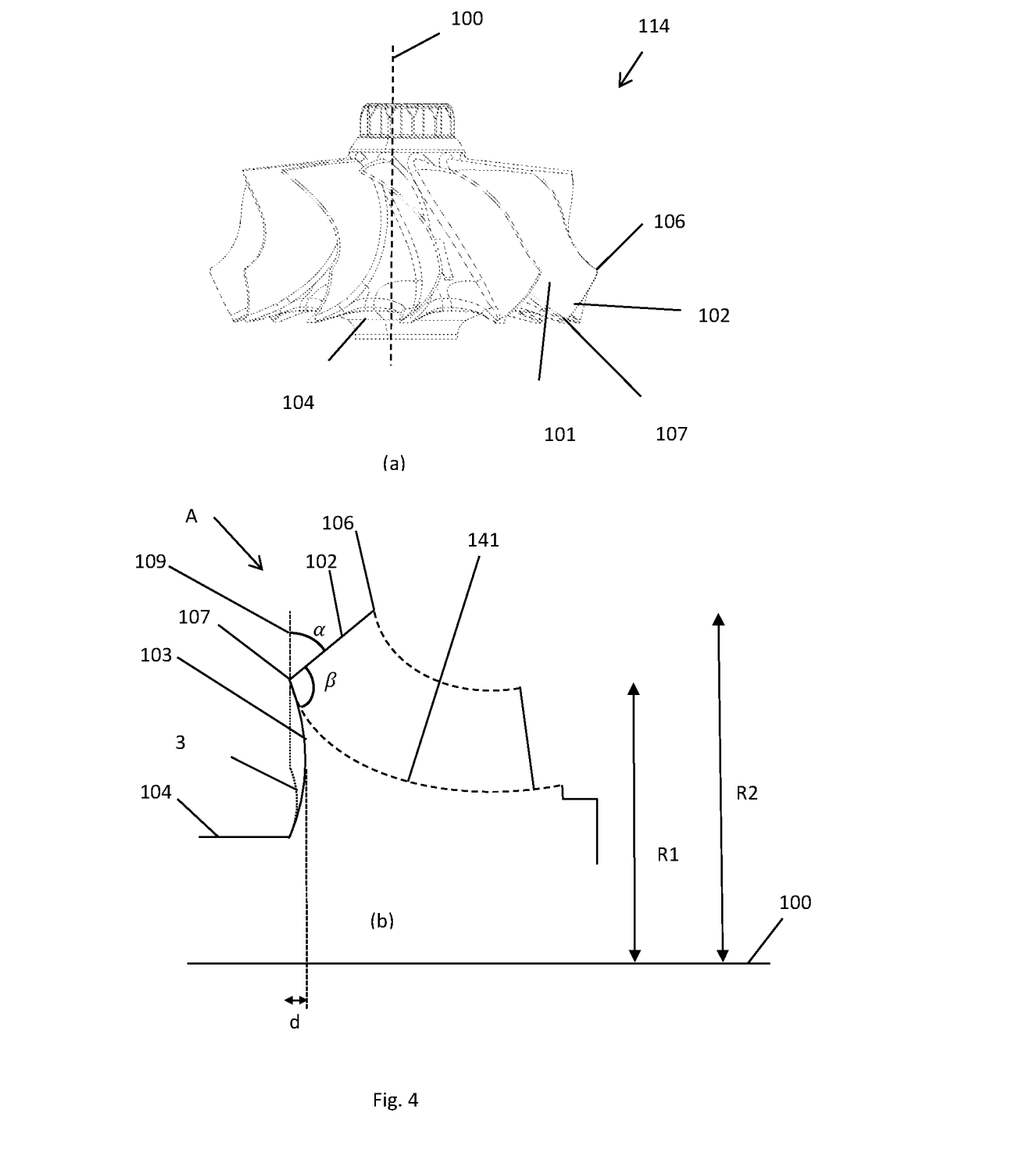
FIG. 4 is composed of FIG. 4(a) and FIG. 4(b) which are views of a turbine wheel which is a first embodiment of the disclosure.

FIG. 4(*b*) also illustrates the back face 103 ("datum face) of the turbine wheel 114, and for comparison shows (by a dotted line) the back face 3 of one of the known turbine wheels 14. The back face 103 is not flat, but rather concave: it is "scalloped". As mentioned above, the back face 3 of one of the known turbine wheels includes a radially-inner scalloped (concave) portion and a radially-outer planar portion. By contrast, the back face 103 of the turbine wheel 114 is concave substantially as radially outwardly as the back ends 107 of the inducer tips 102.

Furthermore, the back face 103 displaced relative to the back face 3 of one of the known turbine wheel 14, in the axial direction towards the turbine outlet. The increased degree of scalloping of the back face 103 is possible because of the radial component of the length direction of the inducer tip 2; in other words, because the mixed flow angle α is less than 90°. We define the cutback angle β as the angle between (i) the component of the length direction of an inducer tip 102 which is perpendicular to the circumferential direction, and (ii) the tangent to the back surface 103 in a plane including the axis 100 and which passes through the back end 107 of the inducer tip 102. Typically, this will be equivalent to the angle, in the plane including the axis 100 and the back end 107, between the radial direction and the tangent to the back surface which is most inclined to the radial direction. We have found in numerical simulations that the value of the cutback angle β should preferably be in the range 80° to 100°. A smaller value of the cutback angle β than 80° creates too much stress in the blade; a larger value of the cutback angle β than 100° greatly reduces the mass saving produced by the scalloping.

A cutback depth value d is defined as the maximum distance of the back surface 103 from an axial plane (i.e. one perpendicular to the axis 100) which passes through the back end 107 of an inducer tip 102. This is measured at the circumferential position at which d is greatest.

To quantify suitable values for d we use an average radius, which may be defined as a parameter referred to here as the mean radius. This is defined by the expression $$\text{Mean Radius} = \frac{R1 + R2}{2} \quad (1)$$

where R1 is the distance of the back end point 107 from the axis 100, and R2 is the distance of the front end point 106 from the axis 100. In numerical simulations we have found that the blade is not subject to unacceptable stresses provided that the cutback ratio, defined as $$\text{Cutback ratio} = \frac{d}{\text{Mean Radius}} \quad (2)$$

is no higher than 0.08. Within this constraint, it is preferred that d should be as high as possible, to produce the maximum saving in the mass of the turbine wheel. A significant reduction in the moment of inertia of the turbine wheel is produced if the cutback ratio is greater than 0.01. For example, d may be at least 0.05 times the mean radius, or at least 0.06 times the mean radius, or at least 0.07 times the mean radius. In some circumstances it may be preferable to define the average radius in terms of a root-mean square (RMS) of the values R1 and R2.

Figure 5:
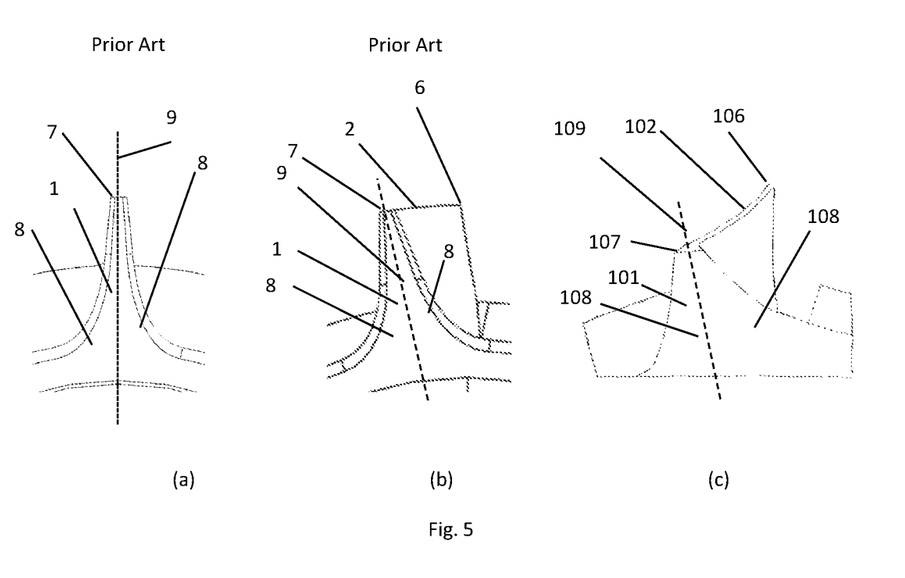

FIG. 5(*a*), (b) and (c) respectively show enlarged views of the back end of a blade of the turbine wheels 14 of FIGS. 2 and 3, and the turbine wheel 114 of FIG. 4. As shown in each of FIGS. 5(*a*) to 5(*c*), the blades 1 in each form of the turbine wheel 14, are supported by "webbing" 8 to either side. This webbing 8 defines all of the radially-outer edge of the back face 3 except the back ends 7 of the inducer tips 2. The webbing in each form of the turbine wheel 14 is mirror symmetric about a plane including the axial direction 100 and a radial line 9 passing through the centre of the back end 7 of the inducer tip 2 (this is the centre of the back end 7 in the circumferential direction, here called the "circumferential centre"). Likewise in the turbine wheel 114, webbing 108 is provided which is mirror symmetric about a plane including the axial direction 100 and a radial line 109 passing through the circumferential centre of the back end 107 of the inducer tip 102. Bucketing (as in FIGS. 5(*b*) and 5(*c*)) requires the thickness of the webbing 8, 108 to be increased compared to a turbine with little or no bucketing, so the heavy bucketing of a mixed-flow turbine wheel requires the webbing 108 to be thicker than for a turbine wheel with little or no bucketing.

Figure 6:
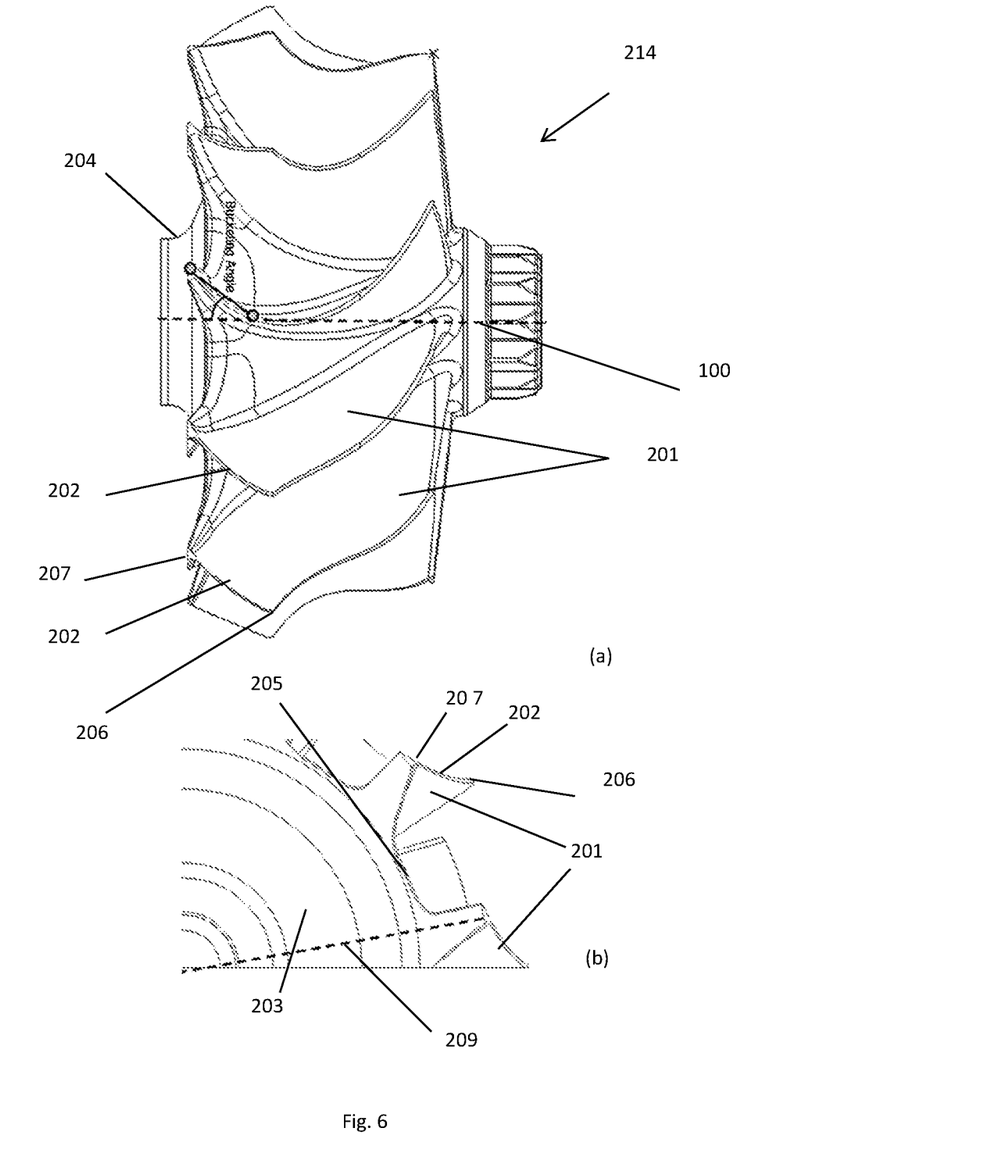
FIG. 6 is composed of FIG. 6(a), which is a side view of a turbine wheel which is a second embodiment of the disclosure, and FIG. 6(b) which is a view of a portion of the turbine wheel of FIG. 6(a)
Figure 7:
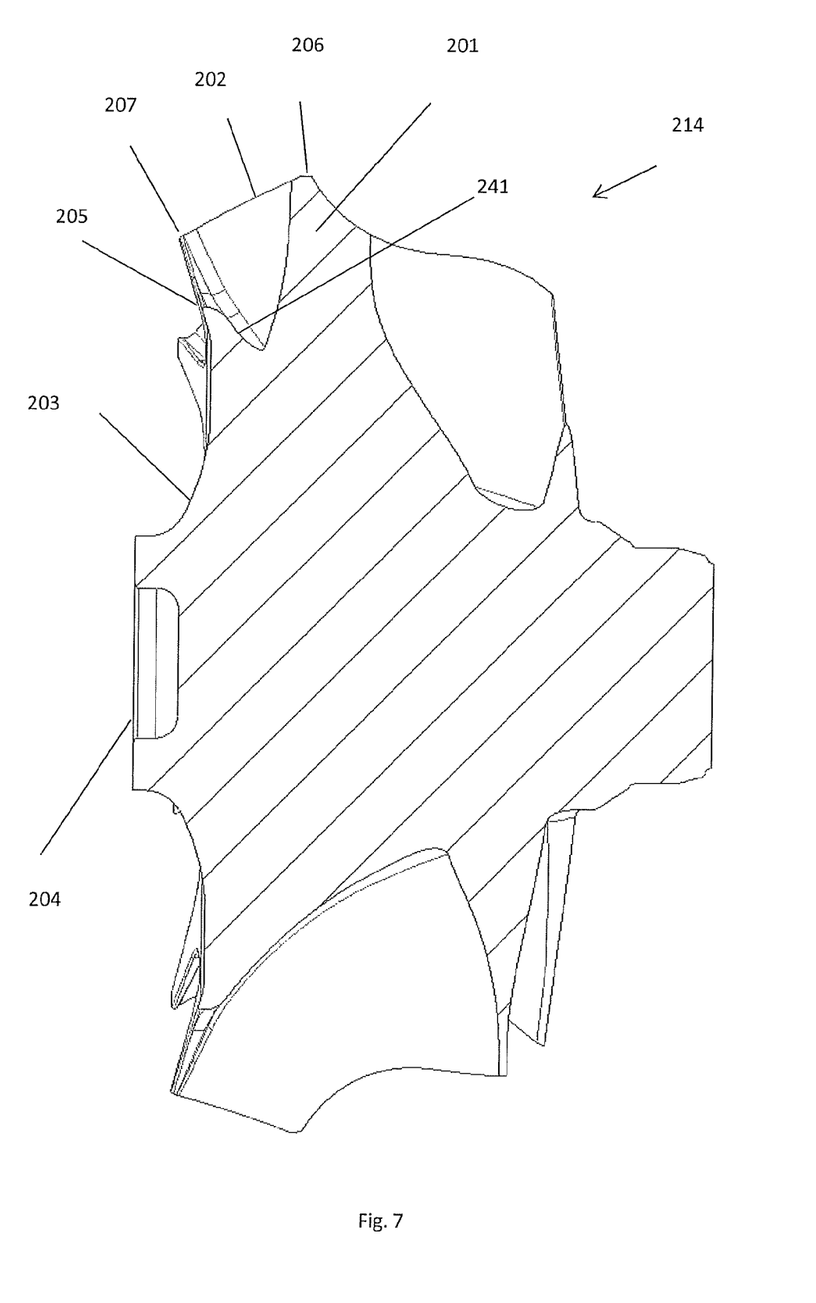
FIG. 7 is a cross-sectional view of the turbine wheel of FIG. 6.

Referring to FIGS. 6 and 7, a turbine wheel 214 which is a second embodiment of the disclosure is illustrated. FIG. 6(*a*) is a side view of the turbine wheel looking towards its rotational axis 100; FIG. 6(*b*) is a perspective view of an outer portion of the turbine wheel 214; and FIG. 7 is a cross-sectional view in a plane including the axis 100.

The turbine wheel 214 is suitable for use in a turbocharger as shown in FIG. 1, replacing the turbine wheel 14. Elements having the same meaning as corresponding elements of the turbine wheels 14 of FIGS. 2 and 3 are given reference numerals 200 higher. The turbine wheel 214 is a one-piece element formed typically by casting and machining. The turbine wheel 214 includes blades 201, having inducer tips 202. Denoting the number of blades by n, the turbine wheel 214 has n-fold rotational symmetry about an axis which in use is the rotational axis 100 of the turbine. Each inducer tip 202 has a front end 206 and a back end 207. In FIG. 6(*b*), dashed line 209 indicates a radial line from the axis 100 to the inducer tip 202 of one of the blades 201. The turbine wheel has a back face 203 which extends from a hub 204. In use the hub 204 is connected to the shaft (not shown) of the turbo-machine, with the axis 100 passing through the centre of the hub 204. The back face 203 is the side of the turbine wheel 214 which faces towards the bearing housing, and it extends away from the axis 100.

The radially-outer edge of the back face 203 is a line of which the radially-outermost points are the back ends 207 of the inducer tips 202. The radially-innermost points on the radially-outer edge of the back face 203 are marked as 205, and are approximately equidistant between the circumferential centres of the respective back ends 207 of the inducer tips 202 of the neighbouring pair of blades 201.

Considering a reference line which is parallel to the rotational axis 100, and which intercepts the circumferential centre of the front end 206 of one of the inducer tips 102, we define the "bucketing angle" as the angle between the reference line and the component of the length direction of the inducer tip 2 which is perpendicular to the radial direction Thus, if the inducer tip 202 is slightly curved, the bucketing angle would be defined as the angle between (i) the reference line and (ii) a straight line connecting the circumferential centres of the ends 206, 207 of the inducer tip 202. Thus, if the bucketing angle were zero, this would indicate that the inducer tips 2 have no component in a circumferential direction.

Turning to FIG. 7, the turbine wheel 214 is viewed in a cross-sectional view through a plane including the axis 100. The plane is at a circumferential position such that it includes one of the radially-innermost points 205 on the outer periphery of the back face 203 of the turbine wheel 214. The hub line 241 is the line on the surface of the turbine wheel 214 which extends forwards (i.e. away from the bearing housing and without a circumferential component) away from each point 205.

Figure 8:
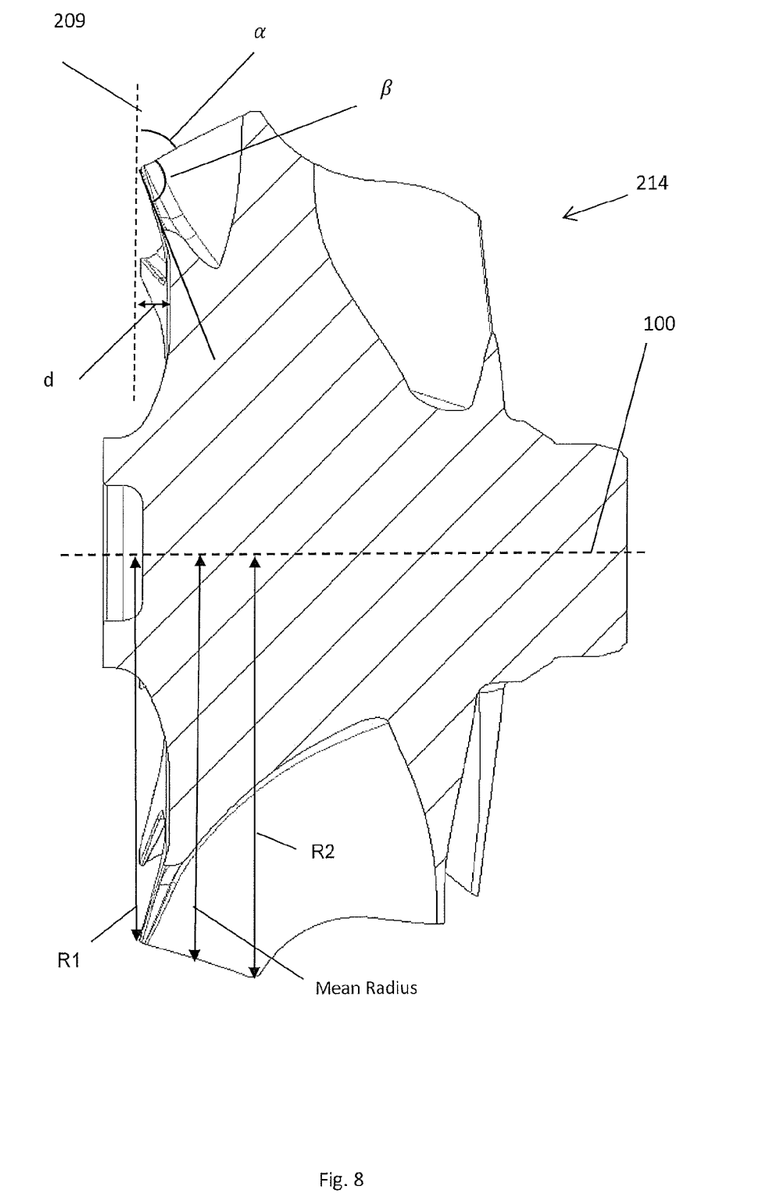
FIG. 8 is an annotated version of FIG. 7.

Like the turbine wheel 114 shown in FIG. 4, the turbine wheel 214 is a mixed-flow turbine wheel. Referring to FIG. 8, we define the mixed flow angle α as the angle between a radial line 209 passing through the back end 207 of the inducer tip, and the component of the length direction of the inducer tip (i.e. the straight line through the circumferential centres of the front and back ends 206, 207 of the inducer tip 202) which is perpendicular to the circumferential direction. As for the turbine wheel 114, for the turbine wheel 214 α is in the range 10° to 45°.

As for the turbine wheel 114, the back face 203 of the turbine wheel 214 is not flat, but rather concave: it is "scalloped". We define the cutback angle β as the angle between (i) the component of the length direction of an inducer tip 202 which is perpendicular to the circumferential direction, and (ii) the tangent to the back surface 203 in a plane including the axis 100 and which passes through the circumferential centre of the back end 207 of that inducer tip 202. Typically, this will be equivalent to the angle, in the plane including the axis 100 and the back end 207, between the radial direction and the tangent to the back surface which is most inclined to the radial direction. As for the turbine wheel 114, the cutback angle β of the turbine wheel 214 should preferably be in the range 80° to 100°.

For the turbine wheel 214, the cutback depth value d is defined as the maximum distance of the back surface 203 from an axial plane (i.e. one perpendicular to the axis 100) which passes through the back end 207 of an inducer tip 202. This is measured at the circumferential position at which d is greatest.

Again, the mean radius is defined by the expression (1), where R1 is the distance of the back end point 207 from the axis 100, and R2 is the distance of the front end point 206 from the axis 100. A cutback ratio is again defined by expression (2). In numerical simulations we have found that the blade is not subject to unacceptable stresses provided that the cutback ratio is no higher than 0.08. Within this constraint, it is preferred that d should be as high as possible, to produce the maximum saving in the mass of the turbine wheel. A significant reduction in the moment of inertia of the turbine wheel is produced if the cutback ratio is greater than 0.01. For example, d may be at least 0.05 times the mean radius, or at least 0.06 times the mean radius, or at least 0.07 times the mean radius.

Figure 9:
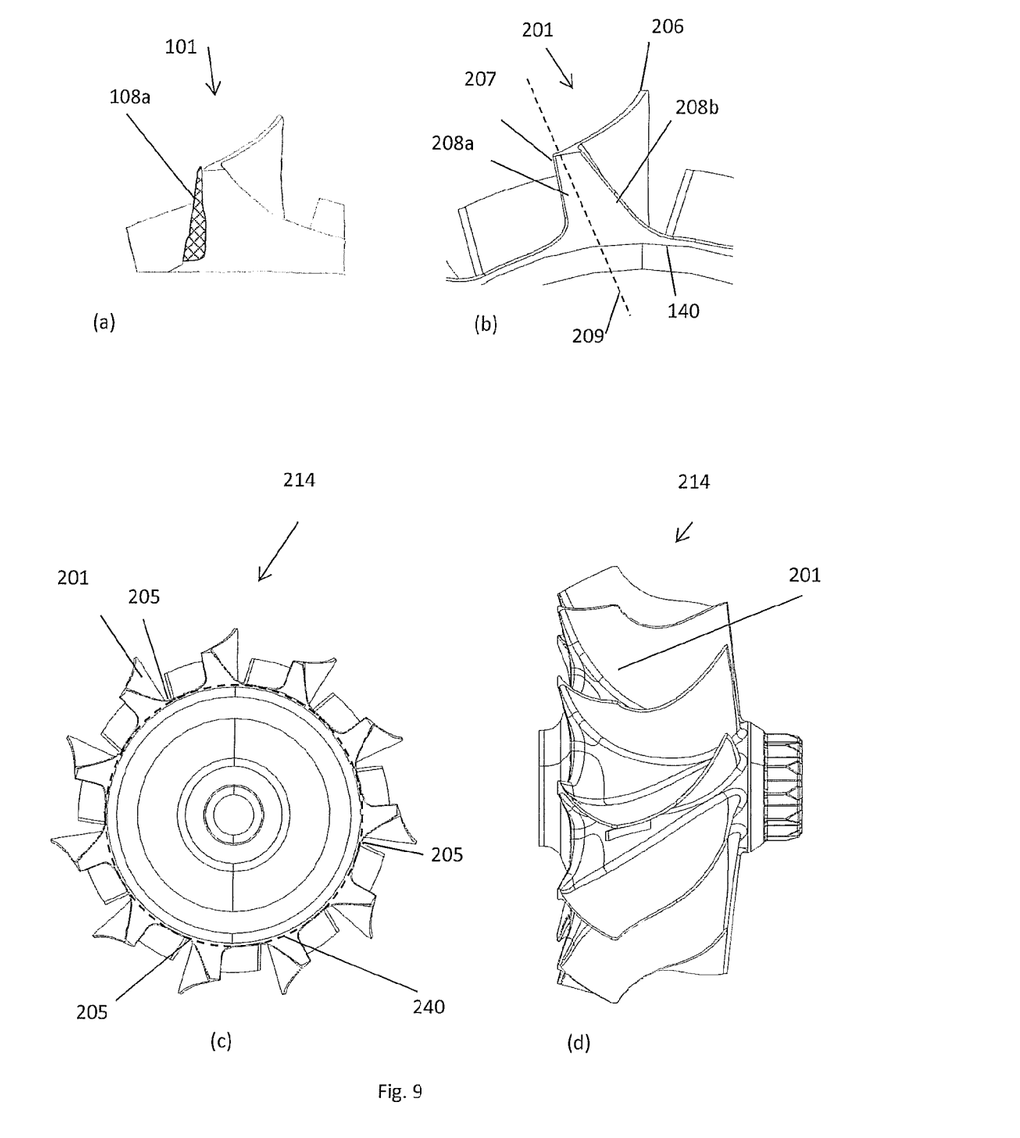
FIG. 9 is composed of FIG. 9(a), which is an annotated version of FIG. 5(c), and FIGS. 9(b) to 9(d), which are further views of the turbine wheel of FIG. 6.

Turning to FIG. 9, a further preferred feature of the second embodiment is explained. FIG. 9(a) is identical to FIG. 5(c), except that a portion 108a of the webbing on the pressure side (that is, upstream) of the blade 101 is highlighted. In numerical simulations, it has been discovered that this portion of the webbing is not required. That is, if it is omitted, the turbine wheel still suffers acceptable stresses.

FIG. 9(c) is a plan view of the turbine wheel 214 of FIG. 6, and FIG. 9(b) is an enlarged portion of FIG. 9(c) showing the end of a single blade 201 in a manner similar to FIG. 9(a). Accordingly, as shown in FIG. 9(b), the blade 201 of the turbine wheel 214 does not include the portion 108a of webbing of the blade 101.

Figure 10:
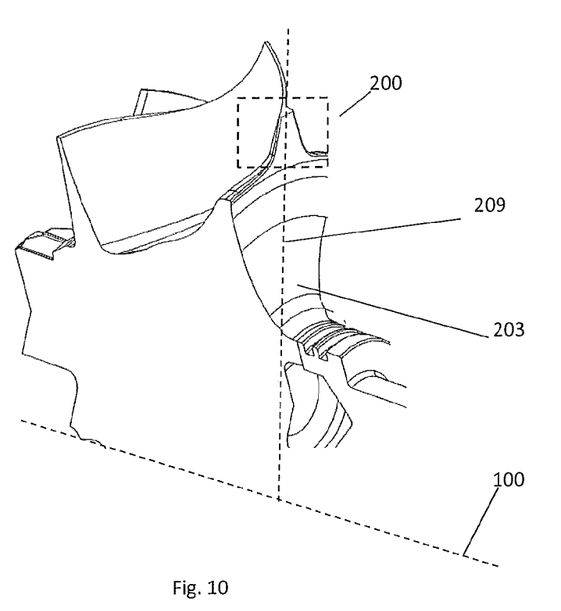
FIG. 10 is a cut-away view of one single-blade segment of the turbine wheel of FIG. 6.

If the number of blades is denoted by n (n=11 in FIG. 9(c)), there are also n points 205. For each of the n points 205, we may define a respective plane which passes through the point 205 and includes the axis 100. The turbine may be considered as n segments, each segment being between a neighbouring pair of the planes. FIG. 10 is a perspective view of a single one of these segments of the turbine wheel of FIG. 6. The dashed line 200 indicates the part of the turbine wheel segment which is illustrated in FIG. 9(b).

Consider a circle 240 which passes through the points 205 at which the radially-outer edge of the back face 203 of the turbine wheel 214 has minimum radial extent. For a single segment, consider the part of the back face 203 of this segment which is radially outside the circle 240. This portion of the back face 203 is partitioned into two by a respective radial line 209 through the circumferential centre of the corresponding back end 7 of the corresponding inducer tip 2. That is, the radial line 209 divides the part of the back face 203 of this segment which is radially outside the circle 140, into an upstream portion 208a (to the left of the line 209 in FIG. 9(b)) and a downstream portion 208b (to the right of the line 209 in FIG. 9(b)). The asymmetry in webbing means that the area of the upstream portion 208a is less than that of the downstream portion 208b. Let us denote the ratio of the area of the downstream portion 208b (i.e. the part of the back face 203 which is outside the circle 140, and circumferentially between the centre of the back end 207 of an inducer tip 202 and its nearest neighbouring point 205 in the downstream direction) and the area of the upstream portion 208a (i.e. the part of the back face 203 which is outside the circle 140, and circumferentially between the centre of the back end 207 of an inducer tip 202 and its nearest neighbouring point 205 in the upstream direction), as γ. Numerical simulations have shown that the stresses on the blade are acceptable, i.e. the blade 201 is supported acceptably well, even if the value of γ is higher than 1.25. A high value of γ is preferred, since it indicates that the mass, and the moment of inertia, of the turbine wheel has been reduced by a greater amount compared to the turbine wheel of FIG. 4.

Numerical simulations have shown that, for high values of γ (such as over 0.25) it is preferable for the bucketing angle to be between 15° and 60°, and more preferably between 20° and 50°, or even between 20° and 40°.

Although only a few embodiments of the diffuser have been described, many variations are possible within the scope of the disclosure as will be clear to a skilled reader.

The invention claimed is:

1. A turbine wheel for a turbine, the turbine wheel having a rotational axis, the turbine wheel including a plurality of blades extending from the rotational axis at equal angular spacing around the rotational axis, each blade including an inducer tip at a back end of the turbine wheel along the rotational axis,
   the inducer tip of each blade having a front end and a back end, and a line from the front end to the back end having a component perpendicular to a circumferential direction which is at a mixed flow angle α to a plane perpendicular to an axial direction, the value of the mixed flow angle α being in the range of 10° to 45°;
   a back surface of the turbine wheel having a concave profile, including a tangent proximate the back end of each inducer tip which is perpendicular to the circumferential direction, and is at a cutback angle β to the component of a line from the front end to the back end of the inducer tip perpendicular to the circumferential direction, the value of the cutback angle β being in the range of 80° to 100°; and the back surface comprising a most forward point which, out of all points on the back surface, is furthest in a forward axial direction from the back end of each inducer tip, a distance in the forward axial direction from the back end of each inducer tip to the most forward point on the back surface of the turbine wheel being in the range of 0.01 to 0.08 times an average radius of the inducer tip.

2. The turbine wheel according to claim 1 in which the distance in the forward axial direction from the back end of each inducer tip to the most forward point on the back surface of the turbine wheel is in the range 0.03 to 0.08 times an average radius of the inducer tip.

3. The turbine wheel according to claim 1 in which the tangent includes the back end of the inducer tip.

4. The turbine wheel according to claim 1 in which the back surface of the turbine wheel is bounded by a radially-outer edge, the radially-outer edge including circumferentially-spaced points which are positions on the radially-outer edge which are closest to the rotational axis, the points being positioned on a circle around the rotational axis, the back surface of the turbine wheel including, for each neighbouring pair of said points, respective area which is radially outside the circle and which lies circumferentially between the respective pair of said neighbouring points, each of the plurality of blades lying circumferentially between a respective said pair of said neighbouring points, each said area of the back surface being partitioned into a respective first part and a respective second part by a respective radial line, the respective radial line passing through a circumferential centre of the back end of the inducer tip of the respective said blade; and the first part of the area being at least 1.2 times the second part of the area.

5. The turbine wheel according to claim 4 in which the first part of the area is at least 1.3 times the second part of the area.

6. The turbine wheel according to claim 1 in which the line from the front end to the back end of the inducer tip, has a component perpendicular to the radial direction which is at a bucketing angle to the axial direction in the range from 15° to 40°.

7. The turbine wheel according to claim 6 in which the bucketing angle is in the range 20° to 40°.

8. A turbine wheel for a turbine, the turbine wheel having a rotational axis, the turbine wheel including a plurality of blades extending from the rotational axis at equal angular spacing around the rotational axis, each blade including an inducer tip at a back end of the turbine wheel along the rotational axis, the inducer tip of each blade having a front end and a back end, and a line from the front end to the back end having a component perpendicular to a circumferential direction which is at a mixed flow angle α to a plane perpendicular to an axial direction, the value of the mixed flow angle α being in the range 10° to 45°;

wherein, the turbine wheel has a back surface bounded by a radially-outer edge, the radially-outer edge including circumferentially-spaced points which are the positions on the radially-outer edge which are closest to the rotational axis, the points being positioned on a circle around the rotational axis, the back surface of the turbine wheel including, for each neighbouring pair of said points, respective area which is radially outside the circle, and which lies circumferentially between the respective pair of said neighbouring points, each of the plurality of blades lying circumferentially between a respective said pair of said neighbouring points, each said area of the back surface being partitioned into a respective first part and a respective second part by a respective radial line, the respective radial line passing through a circumferential centre of the back end of the inducer tip of the respective said blade; and the first part of the area being at least 1.2 times the second part of the area.

9. The turbine wheel according to claim 8 in which the first part of the area is at least 1.3 times the second part of the area.

10. The turbine wheel according to claim 8 in which the line from the front end to the back end of the inducer tip, has a component perpendicular to a radial direction which is at a bucketing angle to the axial direction in the range from 15° to 60°.

11. The turbine wheel according to claim 10 in which the bucketing angle is in the range of 20° to 40°.

12. A turbocharger including a turbine wheel having a rotational axis, the turbine wheel including a plurality of blades extending from the rotational axis at equal angular spacing around the axis, each blade including an inducer tip at a back end of the turbine wheel along the rotational axis, the inducer tip of each blade having a front end and a back end, and a line from the front end to the back end having a component perpendicular to a circumferential direction which is at a mixed flow angle α to a plane perpendicular to an axial direction, the value of the mixed flow angle α being in the range of 10° to 45°;

a back surface of the turbine wheel having a concave profile, including a tangent proximate the back end of each inducer tip which is perpendicular to the circumferential direction, and is at a cutback angle β to the component of a line from the front end to the back end of the inducer tip perpendicular to the circumferential direction, the value of the cutback angle β being in the range of 80° to 100°; and the back surface comprising a most forward point which, out of all points on the back surface, is furthest in a forward axial direction from the back end of each inducer tip, a distance in the forward axial direction from the back end of each inducer tip to the most forward point on the back surface of the turbine wheel being in the range of 0.01 to 0.08 times an average radius of the inducer tip.

\* \* \* \* \*